United States Patent
Eilmus et al.

(10) Patent No.: US 9,775,470 B2
(45) Date of Patent: Oct. 3, 2017

(54) SINK ACCESSORY

(71) Applicant: Kohler Co., Kohler, WI (US)

(72) Inventors: Niels J. Eilmus, Sheboygan, WI (US); Jason R. Miller, Sheboygan Falls, WI (US)

(73) Assignee: KOHLER CO., Kohler, WI (US)

( * ) Notice: Subject to any disclaimer, the term of this patent is extended or adjusted under 35 U.S.C. 154(b) by 742 days.

(21) Appl. No.: 13/796,933

(22) Filed: Mar. 12, 2013

(65) Prior Publication Data
US 2014/0259377 A1    Sep. 18, 2014

(51) Int. Cl.
*A47J 47/20*    (2006.01)

(52) U.S. Cl.
CPC ...................... *A47J 47/20* (2013.01)

(58) Field of Classification Search
CPC .......... A47J 47/20; A47K 10/08; A47K 3/281
USPC ..... 4/638–639, 656–657, 559; 248/302, 153, 248/175, 218.1, 249, 465.1; 211/106, 211/85.31, 90.03, 112, 119, 126.7–126.9
See application file for complete search history.

(56) References Cited

U.S. PATENT DOCUMENTS

| | | | |
|---|---|---|---|
| 477,137 A | 6/1892 | Mesick | |
| 611,561 A * | 9/1898 | Cook | D06F 1/12 211/90.03 |
| 1,580,847 A * | 4/1926 | Moineau | A47K 5/02 211/106 |
| D97,654 S | 11/1935 | Watral | |
| D175,245 S | 8/1955 | Bertone | |
| 2,925,919 A | 2/1960 | Wilson | |
| D194,056 S | 11/1962 | Chapman | |
| D247,416 S | 3/1978 | Berman et al. | |
| D268,878 S | 5/1983 | Taylor | |
| 5,181,621 A * | 1/1993 | Plaehn | A47K 5/04 211/119.011 |
| D362,943 S | 10/1995 | Licari | |
| 5,547,087 A | 8/1996 | Licari | |
| 5,823,366 A * | 10/1998 | Bellamy | A47K 3/004 211/119.011 |
| 5,865,325 A | 2/1999 | Comstock | |
| D416,364 S | 11/1999 | Newhall | |
| D439,716 S | 3/2001 | Wright | |
| 6,341,704 B1 | 1/2002 | Michel, Jr. | |
| D473,359 S | 4/2003 | Joseph | |
| D518,615 S | 4/2006 | Yang | |

(Continued)

FOREIGN PATENT DOCUMENTS

| CN | 102747761 | 10/2012 |
|---|---|---|
| DE | 102009035657 | 2/2011 |
| GB | 2493937 | 2/2013 |

OTHER PUBLICATIONS

Kohler "Fixtures" Product Catalog 2011; pp. 377-383.

*Primary Examiner* — Allana Lewin Bidder
*Assistant Examiner* — William R Klotz
(74) *Attorney, Agent, or Firm* — Foley & Lardner LLP

(57) ABSTRACT

A sink accessory comprising a wire-form attachment structure and a supporting structure. The wire-form attachment structure is configured to be secured to a section of a divider of the sink to support the sink accessory. The attachment structure includes a base, a first leg, and a second leg spaced apart from the first leg. The supporting structure is coupled to and extends from one of the first and second legs. The supporting structure is also configured to extend offset from and adjacent to the divider.

9 Claims, 8 Drawing Sheets

(56) References Cited

U.S. PATENT DOCUMENTS

| | | | |
|---|---|---|---|
| D518,936 S | 4/2006 | Yang | |
| D520,699 S | 5/2006 | Yang et al. | |
| D554,318 S | 10/2007 | Yang et al. | |
| D583,119 S | 12/2008 | Sofy et al. | |
| D595,914 S | 7/2009 | Housley | |
| D608,112 S | 1/2010 | Eilmus | |
| D630,396 S | 1/2011 | Yang et al. | |
| D687,610 S | 8/2013 | Jönsson et al. | |
| D693,081 S | 11/2013 | Yang et al. | |
| D695,982 S | 12/2013 | Jönsson | |
| D695,983 S | 12/2013 | Jönsson et al. | |
| D706,009 S | 5/2014 | Cooper | |
| 8,801,926 B2 * | 8/2014 | Housley | A47J 43/24 210/232 |
| 9,022,329 B2 * | 5/2015 | Gallup | H02G 3/0443 248/153 |
| 2010/0275368 A1 | 11/2010 | Miller et al. | |
| 2011/0303626 A1 | 12/2011 | Roenne | |
| 2012/0266377 A1 | 10/2012 | Eilmus | |

* cited by examiner

SINK ACCESSORY

BACKGROUND

The present application relates generally to the field of attachments or accessories for wash receptacles. More specifically, the present application relates to sink accessories configured to removably attach to a sink.

SUMMARY

One embodiment relates to a sink accessory comprising a wire-form attachment structure and a supporting structure. The wire-form attachment structure is configured to be secured to a section of a divider of the sink to support the sink accessory. The attachment structure includes a base, a first leg, and a second leg spaced apart from the first leg. The supporting structure is coupled to and extends from one of the first and second legs. The supporting structure is also configured to extend offset from and adjacent to the divider.

Another embodiment relates to a kitchen sink assembly. The kitchen sink assembly includes a first basin having an inner wall, a second basin having an inner wall, a dividing wall extending between the inner walls of the first and second basins to form a divider therebetween, and an accessory configured to removably attach to the divider. The accessory includes a wire-form first attachment structure configured to secure the accessory to a first section of the divider, a wire-form second attachment structure spaced apart from the first attachment structure and configured to secure the accessory to a second section of the divider, and a supporting structure configured to extend between the first and second attachment structures adjacent to one of the inner wall of the first basin and the inner wall of the second basin.

Yet another embodiment relates to an accessory for use with a kitchen sink. The sink accessory includes a first attachment structure, a second attachment structure, a supporting structure, and a retaining member. The first attachment structure includes at least two spaced apart members and is configured to attach to a first section of the sink to support the accessory. The second attachment structure includes at least two spaced apart members and is configured to attach to a second section of the sink to support the accessory. The supporting structure extends between the first and second attachment structures and includes at least two spaced apart elongated members and a plurality of segments provided above the at least two elongated members. The retaining member extends between the first and second attachment structures and is coupled to at least two different segments.

DETAILED DESCRIPTION

Referring generally to the Figures, disclosed herein are accessories, such as rack systems, for use with a sink and components thereof. The disclosed sink accessories are configured to removably attach to a sink and to support other articles or objects to improve the convenience and conditions (e.g., cleanliness) of the working area of the sink. The accessories may be suitable for use with sinks installed in various environments such as a kitchen, bar, bathroom, or any other location where sinks may be installed. The accessories may include one or more attachment structures configured to affix the accessory to a sink. For example, the attachment structure(s) may be configured to removably affix the accessory to a divider of a sink, such that the accessory may be provided in the sink and straddling the divider. The accessories may also include one or more supporting structures configured to support an article or object placed onto the supporting structure. The accessories may also include one or more retaining members configured to help maintain the connection between the accessory and the sink. For example, the retaining member may engage the sink, such as a wall forming the divider to help stabilize and support the accessory attached to the sink.

Figure 1:
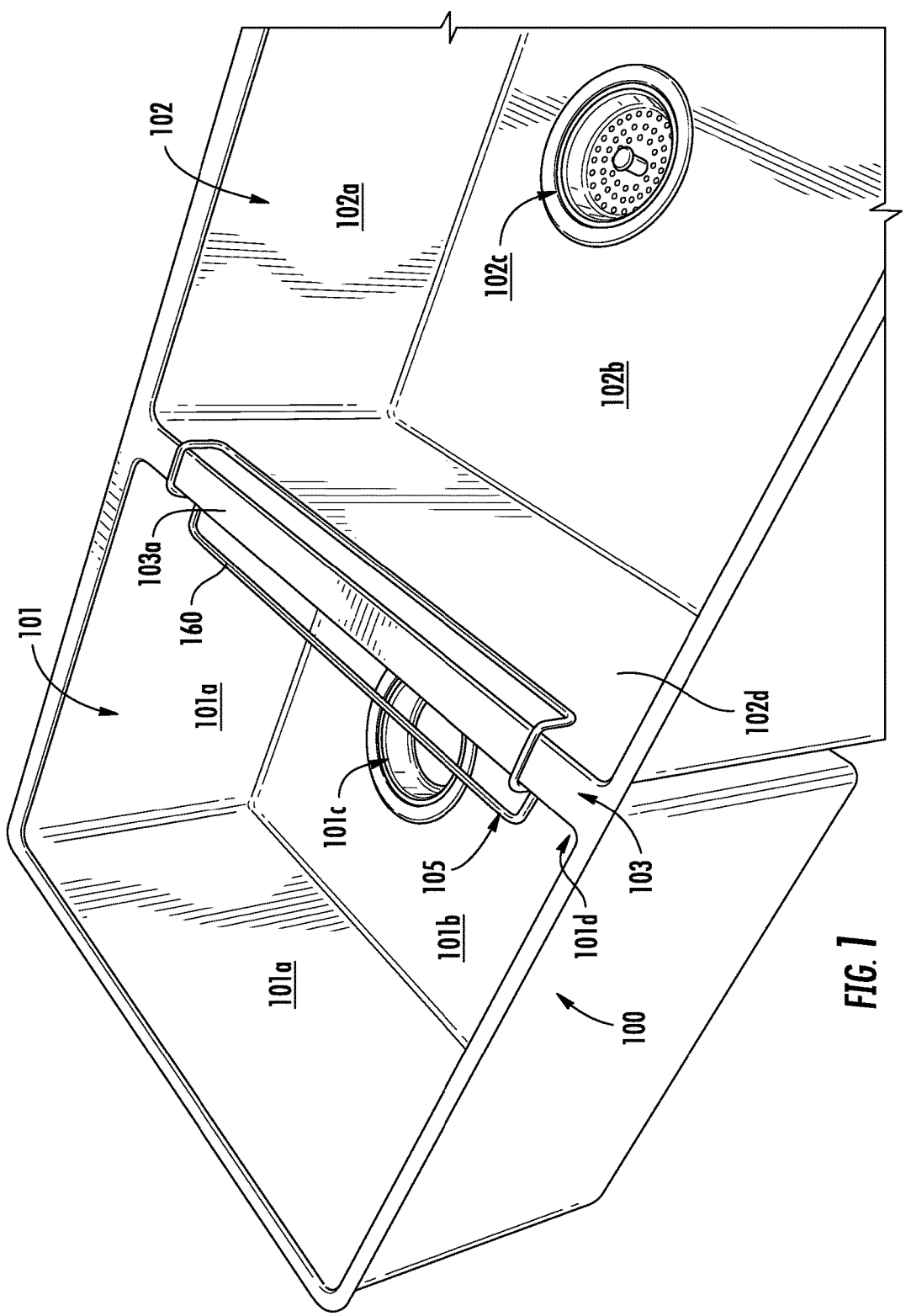
FIG. 1 is a perspective view of a sink with a sink accessory attached thereto, according to an exemplary embodiment.

FIG. 1 illustrates an exemplary embodiment of a sink 100 that includes a first basin 101, a second basin 102, and a divider 103 (e.g., a saddle). The first basin 101 may include a plurality of walls 101*a* (e.g., four walls, six walls, etc.) that extend in a generally upward direction from a bottom 101*b* (e.g., floor). The walls 101*a* may be configured generally perpendicular to the bottom 101*b* or may extend at any suitable angle relative to the bottom 101*b*. The first basin 101 may include a drain 101*c* (e.g., outlet, opening, etc.) disposed in the bottom 101*b*. The second basin 102 may include a plurality of walls 102*a* (e.g., four walls, six walls, etc.) that extend in a generally upward direction from a bottom 102*b* (e.g., floor). The walls 102*a* may be configured generally perpendicular to the bottom 102*b* or may extend at any suitable angle relative to the bottom 102*b*. The second basin 102 may include a drain 102*c* (e.g., outlet, opening, etc.) disposed in the bottom 102*b*. It is noted that the sink 100 may be configured to include any number of basins, which may have similar or different configurations (e.g., size, shape, depth, etc.).

The divider 103 may be defined by one or more walls from the basins 101, 102. For example, an inner wall 101*d* of the first basin 101 and an inner wall 102*d* of the second basin 102 may define the divider 103. Also, for example, the divider may include a wall 103*a* (e.g., an upper wall, a top wall, etc.). The wall 103*a* may extend between the inner walls 101*d*, 102*d* of the first and second basins 101, 102 to form the divider 103 therebetween. Thus, the divider may have an inverted U-shape (e.g., cross-section) as shown in FIGS. 1-3, or may have any suitable shape that divides the basins of the sink (e.g., the divider may be a "full height" divider that extends from the top of the sink to the basin, or may be a "partial height" divider that extends from the bottom of the sink to a location lower than the top of the sink).

Also shown in FIG. 1, an accessory 105 (e.g., sink accessory) is removably attached to the sink 100. The accessory 105 is configured to support another object or article, such as, for example, a dishcloth, towel, or other suitable object. The accessory 105 may be configured to removably (e.g., selectively) attach (e.g., mount, couple, etc.) to the divider 103 of the sink 100, such that the article supported by the accessory 105 may be provided in (e.g., hung in, disposed within, etc.) one of the basins 101, 102 of the sink 100. The accessory 105 may have a single support (e.g., supporting structure) or may have any number of supports, such as to provide support to more than one article. As shown in FIG. 1, the accessory 105 is configured to straddle the divider 103 with a supporting structure 160 disposed within the first basin 101. However, the accessory 105 may be flipped around (e.g., rotated 180) to attach to the divider 103 with the supporting structure being provided in the second basin 102. The configuration of the accessory 105 is described in greater detail below.

Figure 2:
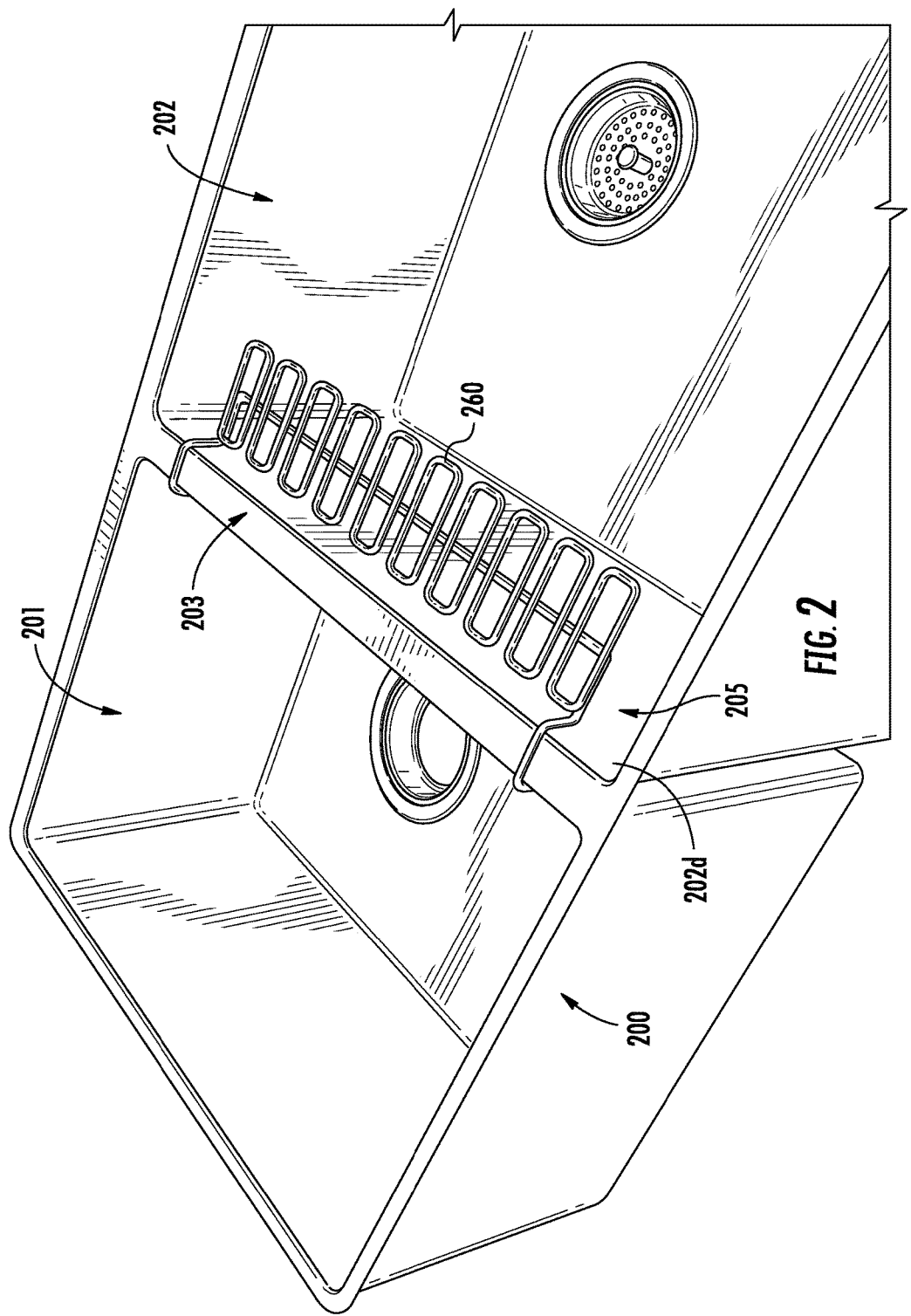
FIG. 2 is a perspective view of a sink with a sink accessory attached thereto, according to another exemplary embodiment.

FIG. 2 illustrates another exemplary embodiment of a sink 200 that includes a first basin 201, a second basin 202, and a divider 203. The basins 201, 202 and the divider 203 of the sink 200 may be configured similar to or differently than those corresponding features described above for the sink 100. As shown, an accessory 205 is removably hung from the divider 203 with a supporting structure 260 being disposed in the second basin 202. However, the accessory 205 may be flipped around to be provided in the first basin 201. The configuration of the accessory 205 is described in greater detail below.

Figure 3:
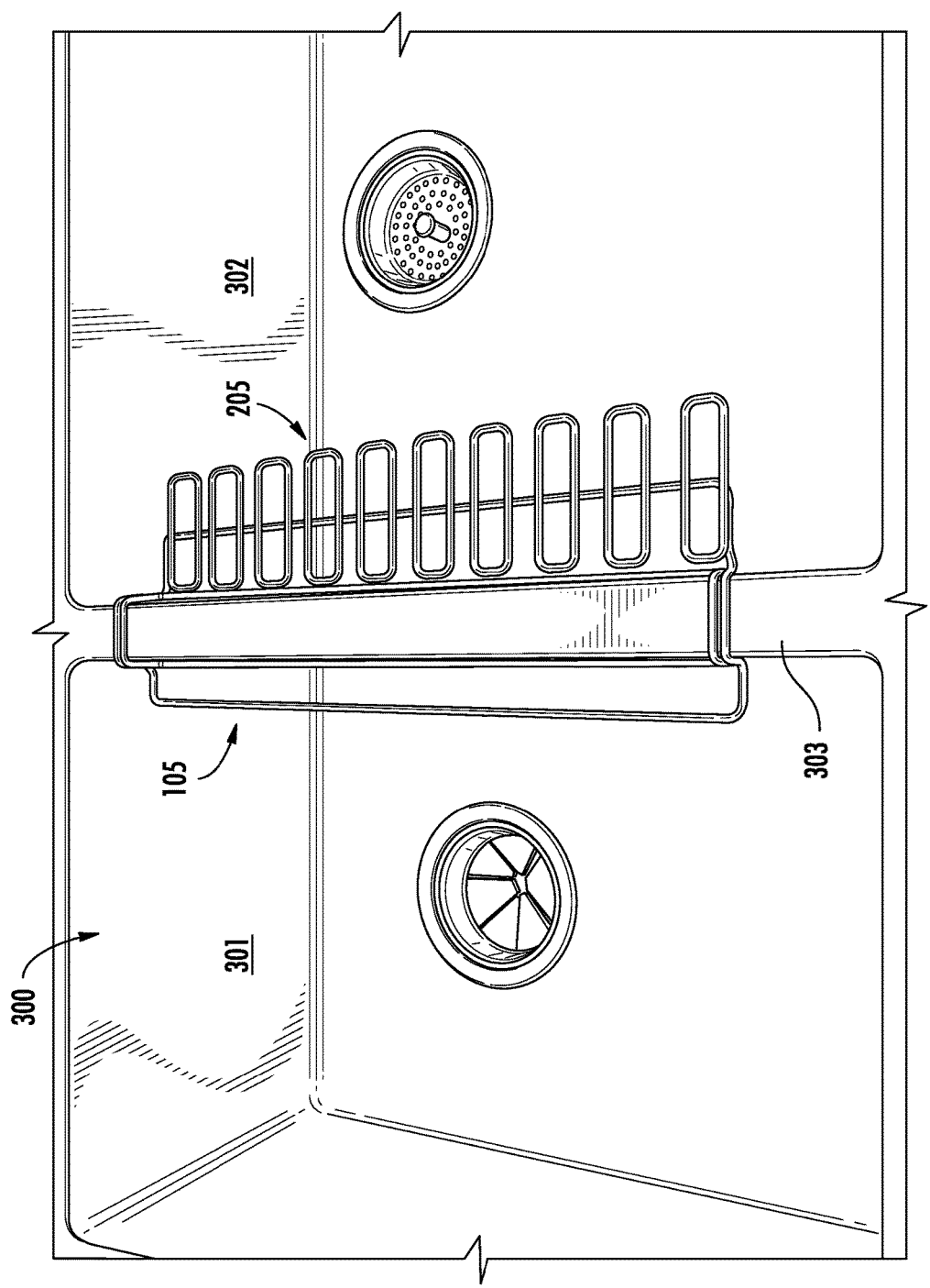
FIG. 3 is a perspective view of a sink with a sink accessory attached thereto, according to yet another exemplary embodiment.

FIG. 3 illustrates yet another exemplary embodiment of a sink 300 that includes a first basin 301, a second basin 302, and a divider 303. The basins 301, 302 and the divider 303 of the sink 300 may be configured similar to or differently than those corresponding features described above for the sink 100.

Figure 7:
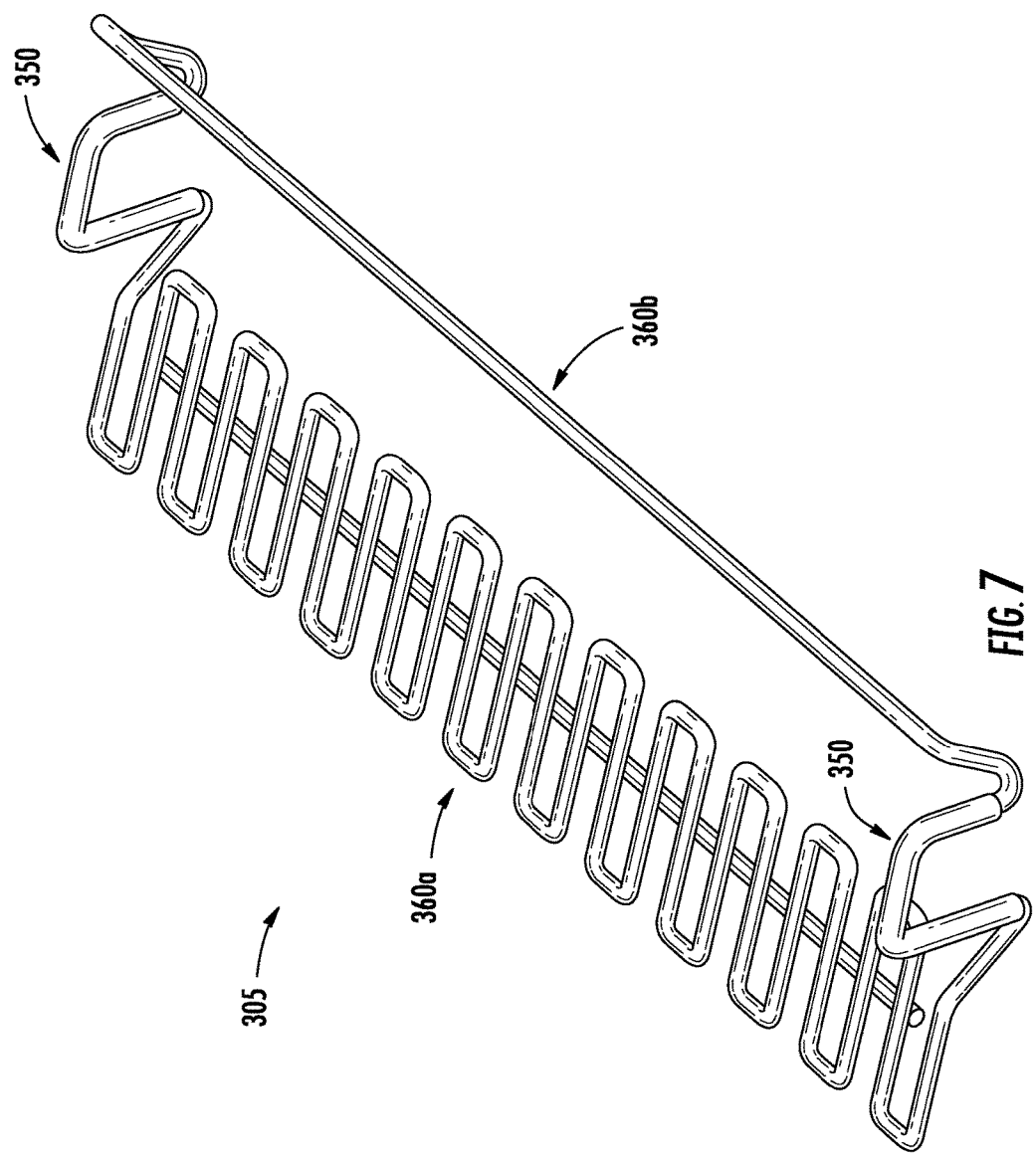
FIG. 7 is a perspective view of another exemplary embodiment of a sink accessory.

Also shown in FIG. 3, the accessories 105, 205 may be configured to nest together, such that both accessories 105, 205 are attached to and supported by the divider 303, such that a first supporting structure is in the first basin 301 to support a first article (e.g., a dishtowel) and a second supporting structure is in the second basin 302 to support a second article (e.g., a dish scrubber). Thus, the accessories 105, 205 may be formed separately and configured to operatively couple to the same divider to cooperate in providing additional support relative to just one of the accessories alone. Accordingly, the first supporting structure of the accessory 105 is configured to extend offset from and adjacent to the divider 303 (e.g., the inner wall of the first basin 301), and the second supporting structure of the accessory 205 is configured to extend offset from and adjacent to the divider 303 (e.g., the inner wall of the second basin 302). However, the accessories 105, 205 may be flipped around, such as, for example, to hang from the divider 303 with the first supporting structure provided adjacent to the inner wall of the second basin 302 and the second supporting structure provided adjacent to the inner wall of the first basin 301. As shown in FIG. 7, a single unitary accessory 305 may be configured to include two (or more) supporting structures. The configuration of the accessory 305 is described in greater detail below.

Figure 4:
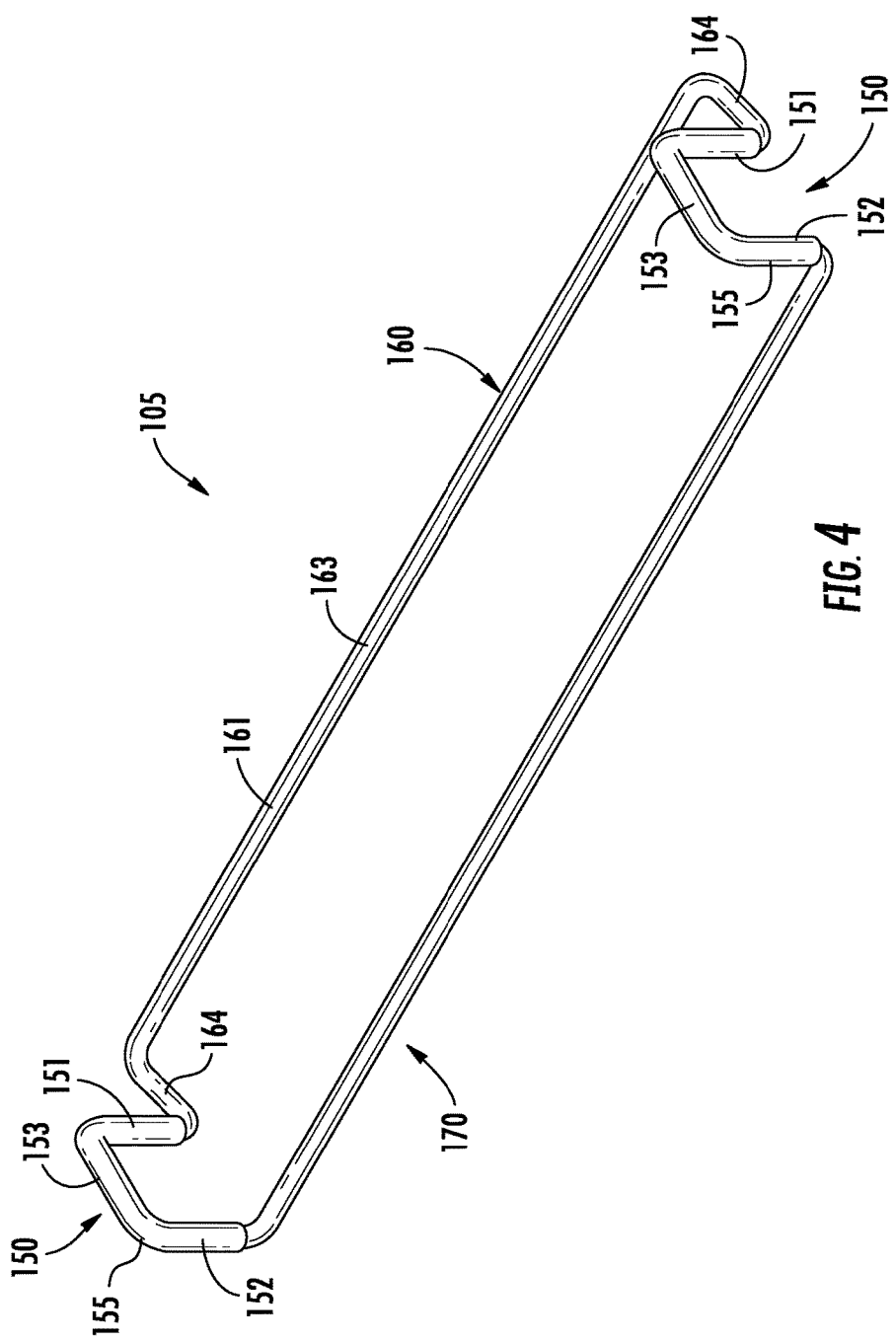
FIG. 4 is a perspective view of an exemplary embodiment of a sink accessory, such as the sink accessory shown in FIG. 1.
Figure 5:
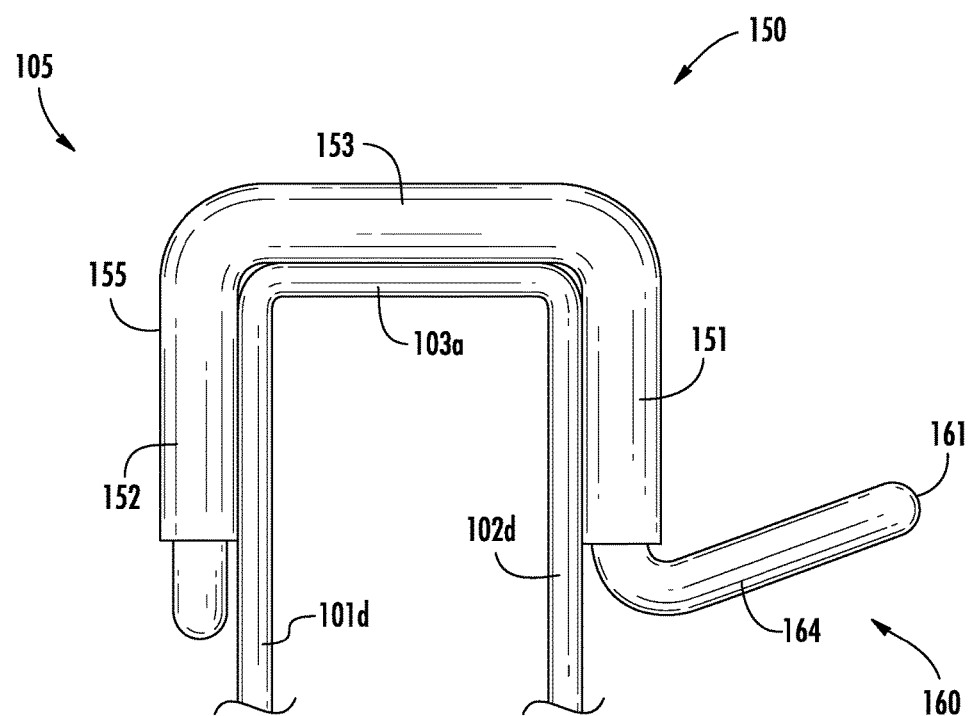
FIG. 5 is a side view of the sink accessory of FIG. 4 attached to a sink.

FIGS. 4 and 5 illustrate the accessory 105 according to an exemplary embodiment. The accessory 105 includes an attachment structure 150 and a supporting structure 160. The attachment structure 150 is configured to secure the accessory 105 to a sink (e.g., the sink 100) in a removable fashion. For example, the attachment structure 150 may be configured to be secured to a section of the divider 103 of the sink 100 to support the accessory 105. The accessory 105 may be configured to be attached to and removed from the sink without the use of tools or fasteners, such as by sliding the attachment structure 150 over the divider 103. The accessory 105 may include more than one attachment structure 150 and/or more than one supporting structure 160. As shown in FIG. 4, the accessory 105 includes two spaced apart (e.g., offset) attachment structures 150 with the supporting structure 160 coupled to and extending between the two attachment structures 150. The supporting structure 160 is configured to support another article (e.g., dishcloth, towel, scrub brush, etc.).

As shown in FIGS. 4 and 5, the attachment structure 150 includes a first leg 151, a second leg 152, and a base 153 provided between the first and second legs 151, 152. The first and second legs 151, 152 may be spaced apart by (and extend from) the base 153. In other words, the attachment structure 150 may be configured as a yoke that is configured to straddle a portion of the sink, such as the divider 103. Thus, the attachment structure 150 may include a spacing between the first and second legs 151, 152, which may be substantially the same as a width of a portion of the sink, such as the divider 103 of the sink 100. For the accessory 105 having more than one attachment structure 150, each additional attachment structure 150 may have a spacing between its respective first and second legs 151, 152 that is substantially the same as the spacing between the first and second legs of the first attachment structure. However, the spacing for each attachment structure 150 may vary, such as to accommodate a divider 103 that has a non-uniform shape (e.g., thickness).

The attachment structure 150 may be configured having an inverted U-shape, such as to mount to a divider having a corresponding inverted U-shape, which may be defined by the inners walls of the basins and the wall interconnecting the inner walls. Accordingly, the first leg 151 and the second leg 152 may be configured to extend generally or substantially perpendicular to the base 153. For example, the base 153 may include a first end and a second end, where the first leg 151 is coupled to and extends from the first end of the base 153 and where the second leg 152 is coupled to and extends from the second end of the base 153. However, the first and second legs 151, 152 may also be aligned at an angle relative to the base 153, such as, for example, with both legs angled in a converging manner.

These yoke-type arrangements of the attachment structures may advantageously allow the attachment structure 150 of the accessory 105 to act as a spring to induce a biasing force to help retain the accessory when affixed to the divider 103. For the example having converging legs, if the natural (i.e., unbiased) spacing between the ends of the legs that are opposite the base is slightly narrower than the width of the divider and the spacing between the ends of the legs that are coupled to the base is slightly larger than the width of the divider, then when the accessory is placed onto the divider, the legs of the attachment structure are splayed open a predetermined amount to accommodate the width of the divider. When the legs of the attachment structure are splayed, a biasing force may be induced that may act to clamp the attachment structure to the divider to help retain the accessory to the divider. Additionally, the attachment structure 150 may have other tailored shapes configured to affix the accessory to a sink having a different configuration.

The attachment structure 150 may be in the form of a wire or a plurality of interconnected wires. In other words, the attachment structure 150 may have a wire-form configuration that comprises one or more wires. For example, the attachment structure 150 may be a continuous wire where the first and second legs 151, 152 are formed from the base 153, such as by bending the legs into the shape (e.g., inverted U-shape) from the base. Accordingly, the attachment structure 150 may include a transition, such as a curved portion having a radius, provided between each leg and the base. Alternatively, the each leg (e.g., first leg 151, second leg 152) may be separately formed from the base 153 and coupled thereto to form the attachment structure 150.

The legs (e.g., first leg 151, second leg 152) of the attachment structure 150 may be configured to support other features of the accessory. For example, each first leg 151 may be configured to support the supporting structure 160, and each second leg 152 may be configured to support a retaining member 170 or other feature. As shown in FIG. 4, each first leg 151 includes an end (e.g., the end opposite the end attached to the base 153) that is coupled to the supporting structure 160, and each second leg 152 includes an end (e.g., the end opposite the end attached to the base 153) that is coupled to the retaining member 170. It is noted that the legs may be configured to support different features, such as, for example, the first leg may support the retaining member and the second leg may support the supporting structure. It is also noted that the attachment structure 150 may include more than two legs, such as to support additional members or features of the accessory 105.

The accessory (e.g., accessory 105) may also include features that help prevent wear (e.g., scratching, abrasion, etc.) to the sink when attaching and removing the accessory. For example, the accessory 105 may include a sleeve that is configured to surround one or more portions of the accessory 105 that come into contact with the sink. As shown in FIGS. 4 and 5, the accessory 105 includes a sleeve 155 disposed around the attachment structures 150 to help prevent wear to the sink when the accessory is attached and removed from the divider of the sink. The sleeve 155 may be made from a resilient (e.g., flexible), yet durable material, such as silicone in order to be compliant enough to extend around formed (e.g., bent) sections of accessory 105 and strong enough to withstand repeated connecting to and disconnecting from the sink. However, it is noted that the sleeve 155 may be made from other suitable materials that are resilient and durable.

The sleeve 155 may have a cylindrical shape that conforms to the shape of the sections of the accessory 105 around which the sleeve 155 is provided. For example, the sleeve 155 may have an annular cross-sectional shape with an inner diameter that is configured to fit snugly over the outer diameter of the wire sections of the accessory 105. The annular sleeve 155 may also have an outer diameter, which may be configured to be compressed when the accessory 105 is coupled to the sink. For example, the sleeve 155 that is configured to surround the attachment structures 150 (as shown in FIG. 5) may be configured such that the spacing between the outer diameters of the portions of the sleeve 155 that are provided on the first and second legs 151, 152 is less then the width of the divider 103 (i.e., the distance between the outside surfaces of the inner walls 101d, 102d of the basins). Upon coupling the accessory 105 to the divider 103, the walls of the basins compress the portions of the sleeve 155 to provide a snug fit between the accessory 105 and the sink 100. It is noted that the size and shape, including thickness, of the sleeve 155 may be tailored, such as to best prevent wear on the sink.

The accessory 105 may include a coating that is formed over a portion of the accessory to prevent wear on the sink. For example, the sleeve 155 may be a coating or may be over-molded onto the sections (e.g., the wire sections) of the accessory.

As shown in FIG. 4, the supporting structure 160 includes a first member 161. The first member 161 may be an elongated member having a body 163 and a side portion 164 that extends away from the body 163. For example, the side portion 164 of the first member 161 may extend transverse to the body 163. The side portion 164 may also be coupled to the first leg 151 of the attachment structure 150, wherein the body 163 is configured to extend offset from and adjacent to the divider 103 (as shown in FIG. 1). The supporting structure 160 may be coupled to the attachment structure 150 with the side portion 164 of the supporting structure 160 extending generally perpendicular to the first leg 151 or with the side portion 164 extending away from the first leg 151 at an angle of incline. As shown in FIGS. 4 and 5, the angle of incline of the side portion 164 may be an upward angle, where the side portion 164 of the first member 161 extends upwardly, such as relative to horizontal in FIG. 5, and away from the first leg 151 of the attachment structure 150. The angle of incline may be between zero degrees (0°) and ninety degrees (90°), and preferably may be between thirty degrees (30°) and sixty degrees (60°), and most preferably may be about forty-five degrees (45°), that is between forty degrees (40°) and fifty degrees (50°).

The configuration of the side portion 164 of the first member 161 may be tailored, such as to tailor the relationship between the supporting structure 160 (e.g., the body 163) and the sink, such as the divider 103. For example, the length of the side portion 164 may be increased or decreased to move the body 163 away from or toward the divider 103, respectively. Also, for example, the angle of incline of the side portion 164, alone or in combination with the length of the side portion 164, may change the position of the body 163 relative to the divider 103, such as the wall 103a and/or the inner wall 102d. As shown in FIGS. 1 and 5, the angle of incline and/or the length of the side portion 164 may be configured to position (e.g., locate) the body 163 under the wall 103a of the divider 103. This arrangement may advantageously allow for an object (e.g., a cover) to be placed over the basin, such as to close off the opening to provide a look of a continuous countertop, without the body 163 interfering with the covering object. In other words, the body 163 may be configured to be provided below a top surface of the wall 103a to allow objects to be placed onto the sink, such as across the divider of the sink, without contact the body 163. Thus, a cover can be used without having to remove the accessory 105 from the sink 100. Alternatively, the angle of incline and/or the length of the side portion 164 may be configured to position the body 163 above the wall 103a of the divider 103. This arrangement may advantageously allow for an object (e.g., a towel) to be supported by the supporting structure 160 of the accessory 105 without touching the bottom (e.g., the bottom 101b) of the basin, or to be suspended a distance from the bottom to allow a height of water to be retained in the basin without having the object in the retained water.

The supporting structure 160 may also include more than one member. For example, the supporting structure 160 may include a second member that is coupled to the first member, where the second member is configured to provide additional support. The second member may be provided above the first member, such that the first member supports the second member, or below the first member.

The accessory 105 may also include a retaining member 170. The retaining member 170 may be configured to provide support by the way of increasing the stability of the accessory 105 when attached to the sink 100. For example, the retaining member 170 may be configured to extend from the attachment structure 150 to help secure or affix the accessory to the divider 103 of the sink 100.

As shown in FIG. 4, the retaining member 170 extends between the second leg 152 of the first attachment structure 150 and the second leg 152 of the second attachment structure 150. The retaining member 170 may be configured to engage the divider 103 (e.g., the inner wall 102d as shown in FIG. 1) to help support the accessory 105 when mounted to the divider 103. The retaining member 170 may also increase the strength and/or reduce the compliance of the accessory 105. The retaining member 170 may be configured to extend substantially transverse to the second leg 152, the base 153, and/or the first leg 151. The retaining member 170 may be configured to extend substantially parallel to the first member 161. The accessory 105 may also include a transition portion provided between the second leg 152 and the retaining member 170. For example, the transition portion may be a curved portion having a radius and may be coupled to an end of the second leg 152 and an end of the retaining member 170.

According to an exemplary embodiment, the accessory 105 is configured in the form of a single wire (e.g., formed rod, etc.). In other words, one or all of the elements (e.g., attachment structure, supporting structure, retaining member, etc.) of the accessory 105 may be integrally formed. For example, the accessory 105 may be formed from a single piece of straight wire that is formed through one or more operations (e.g., bending operations) to manipulate the wire by forming the elements (e.g., attachment structure, supporting structure, retaining member, etc.) described herein. According to another example, the accessory 105 is made from a plurality of wires that are coupled together through any suitable process.

The accessory 105 may be adjustably configured. For example, the supporting structure 160 may be adjustably configured, such as, to be telescopic from the attachment structure 150 to allow the position of the body 163 to be moved relative to the attachment structure 150. The side portions 164 may have a telescopic configuration to allow the body 163 to move toward or away from the attachment structure 150, depending on whether the user would like the body 163 positioned closer to or farther from the sink (e.g., the divider). The first leg 151 of the attachment structure 150 may have a telescopic configuration to allow the supporting structure 160 to be moved toward (e.g., upward) or away from (e.g., downward) the base 153 of the attachment structure 150 to allow the user to adjust the height of the supporting structure 160 relative to the base 153 and the top of the top of the divider (e.g., the wall 103a).

The angle of incline of the supporting structure 160 may be configured to be adjustable relative to the accessory 105. For example, the supporting structure 160 may be adjustable relative to the attachment structure 150 to allow for the angle of incline of the supporting structure to be varied. Thus, the body 163 of the supporting structure 160 may pivot relative to the attachment structure 150, such as the connection between the first leg 151 and the side portion 164.

The attachment structure 150 may be adjustably configured, such as to vary the spacing between the first and second legs 151, 152. This arrangement may advantageously accommodate sinks having dividers with different widths (e.g., thicknesses). The base 153 may be configured to be telescopic, such that the first leg 151 and the second leg 152 may be moved closer together or farther apart to tailor the spacing between the legs.

The length of the accessory 105 may be adjustably configured. For example, the retaining member 170 and/or the body 163 of the first member 161 may be configured to be telescopic, such that the user may be able to vary the length of the accessory 105, such as to accommodate longer or shorter dish cloths or other objects to be hung from or supported by the accessory 105.

It is noted that the adjustable features/elements disclosed herein may be configured to be selectively lockable, such that the after adjustment, the accessory may be locked into the desired position.

Figure 6:
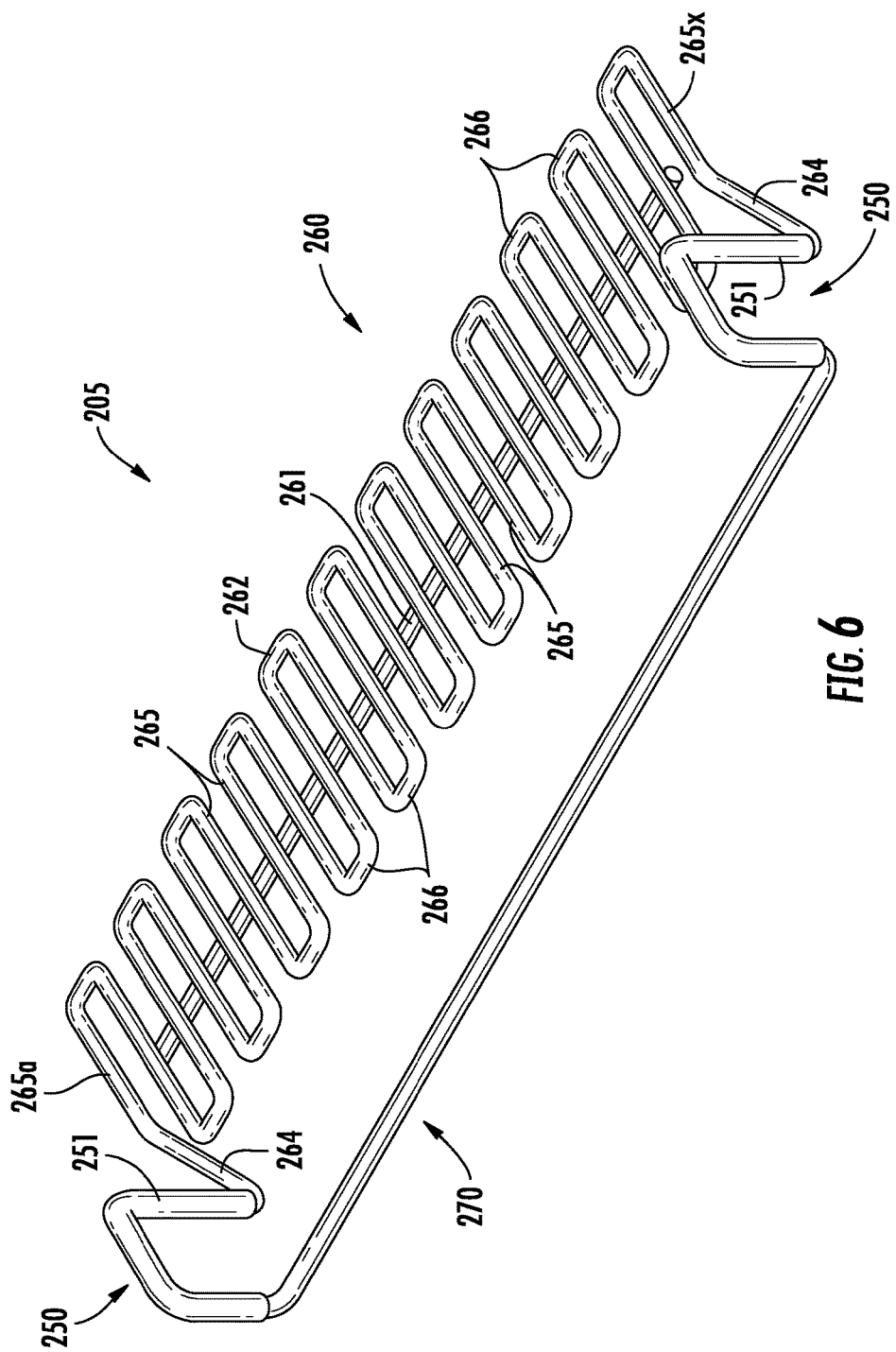
FIG. 6 is a perspective view of another exemplary embodiment of a sink accessory, such as the sink accessory shown in FIG. 2.

FIG. 6 illustrates the accessory 205 according to another exemplary embodiment. The accessory 205 includes an attachment structure 250 and a supporting structure 260. As shown, the accessory 205 includes a pair of opposing attachment structures 250 with a supporting structure 260 extending between the attachment structures 250. The accessory 205 may also include a retaining member 270. Each attachment structure 250 may be configured similar to, the same as, or differently than the attachment structure 150 described above (or any other attachment structure described herein) for the accessory 105. Additionally, the retaining member 270 may be configured similar to, the same as, or differently than the retaining member 170 described above for the accessory 105 (or any other retaining member described herein).

The supporting structure 260 of the accessory 205 may include more than one member. As shown, the supporting structure 260 includes a first member 261 and a second member 262 that is coupled to the first member 261 and configured to provide additional support. The first member 261 may be provided in the form of an elongated wire that extends generally offset from and adjacent to an inner wall of a basin, such as the inner wall 202d shown in FIG. 2.

The second member 262 of the supporting structure 260 may be provided above the first member 261. For example, the second member 262 may be on the first member 261, such that the first member 261 supports the second member 262. The second member 262 may include a segment that extends substantially transverse to the elongated first member 261, such as to couple the transverse segment of the second member 262 and the first member 261 together. As shown in FIG. 6, the second member 262 includes a plurality of segments 265 that extend generally transverse to the elongated first member 261, wherein at least one segment 265 is coupled to the first member 261.

The supporting structure 260 is configured to be coupled to the attachment structure 250. For example, the second member 262 may be configured with at least one segment 265 of the plurality of segments being configured to be coupled to the attachment structure 250. As shown in FIG. 6, the second member 262 includes twenty-four (24) segments 265 with the end segments 265a, 265x being coupled to a first leg 251 of one of the two attachment structures 250 through a respective side portion 264. Alternatively, the second member 262 may include any number of segments and any such segment or segments may be configured to be coupled to one or more of the attachment structures 250 (e.g., its first leg) directly or indirectly through an intervening member, such as the side portion 264. For example, the second member 262 may have a longitudinal length (e.g., a length in the direction parallel to a length of the first member 261) that is greater than a separation distance between the first attachment structure and the second attachment structure (e.g., an offset length between the spaced apart attachment structures). Additionally, the second member 262 may include one or more segments 265 positioned between (e.g., within, inside, etc.) the end segments 265a, 265x, where one or more of the inside segments 265 are configured to be coupled to the attachment structures 250. In other words, the supporting structure 260 may be longer than the spacing between the attachment structure 250 with each attachment structure 250 being coupled to an interior segment 265 (i.e., not an end segment).

The second member 262 may also include a cross-segment that extends substantially parallel to the elongated first member 261 and/or substantially perpendicular to the segment(s) 265. For example, the second member 262 may include a plurality of cross-segments 266 that interconnect the segments 265 to for a "grid-type" second member. In other words, the combination of segments 265 and cross-segments 266 may form a second member 262 having a grill pattern or arrangement. As shown in FIG. 6, the second member 262 includes twenty-three cross-segments 266, where each cross-segment 266 extends between the ends of two adjacent segments 265 to create a "snake-type" second member 262. In other words, the combination of segments 265 and cross-segments 266 may form a second member 262 having a continuously alternating (e.g., a quasi-sinusoidal) pattern or arrangement. It is noted that the second member 262 may be configured having patterns or arrangements that are different than the grill or alternating patterns and still provide an increased size (e.g., area) to support other articles thereupon.

It is noted that the relative spacing between the segments 265 and/or the cross-segments 266, as well as the size (e.g., length, thickness, etc.) and geometry of the segments 265, 266 may be increased or decreased to provide a differently configured supporting structure.

According to an exemplary embodiment, the accessory 205 is configured as a single wire (e.g., formed rod, etc.). For example, the accessory 205 may be formed from a single piece of straight wire that is formed through one or more operations (e.g., bending operations) to manipulate the wire by forming the features described herein. According to another example, the accessory 205 is made from a plurality of interconnected wires. For example, the attachment structure 250 may be made from a first wire, the supporting structure 260 may be made from a second wire, and the retaining member 270 may be made from a third wire, where the first, second, and third wires are coupled together to form the accessory 205. Also, for example, the attachment structure 250, the retaining member 270, and the second member 262 of the supporting structure 260 may be made from a single unitary member (e.g., a first wire), and first member 261 of the supporting structure 260 may be made from a separate member (e.g., a second wire).

FIG. 3 illustrates the accessories 150, 205 separately formed and configured to be nest with one another when coupled to the divider of the sink. According to another exemplary embodiment, the accessory is integrally formed (e.g., a unitary member) to include a first supporting structure and a second supporting structure. The first and second supporting structures may be provided on opposite sides of one or more attachment structures configured to attach to a portion of a sink, such as a divider.

FIG. 7 illustrates the accessory 305 according to another exemplary embodiment. As shown, the accessory 305 includes two spaced apart attachment structures 350, a first supporting structure 360a extending from a first side of the accessory 305, and a second supporting structure 360b extending from a second side of the accessory 305. Each attachment structure 350 may be configured similar to, the same as, or differently than the attachment structure 150, 250 described above (or any other attachment structure described herein). Additionally, the supporting structure 360a may be configured generally the same as (or different than) the supporting structure 260 described above (or any other supporting structure described herein), and the supporting structure 360b may be configured generally the same as (or different than) the supporting structure 160 described above (or any other supporting structure described herein). However, the supporting structures 360a, 360b are connected to the same attachment structures 350 to form a one-piece unitary accessory 305 having two supporting structures. It is noted that the accessories disclosed herein may be configured to include additional supporting structures.

The accessory 305 may also include a retaining member (not shown) configured to help secure or affix the accessory 305 to the sink. The retaining member may be configured to extend from the attachment structures 350 or from one (or both) of the supporting structures. The retaining member may be configured similar to, the same as, or different than the retaining members disclosed herein with respect to the other examples of the accessories.

Figure 8:
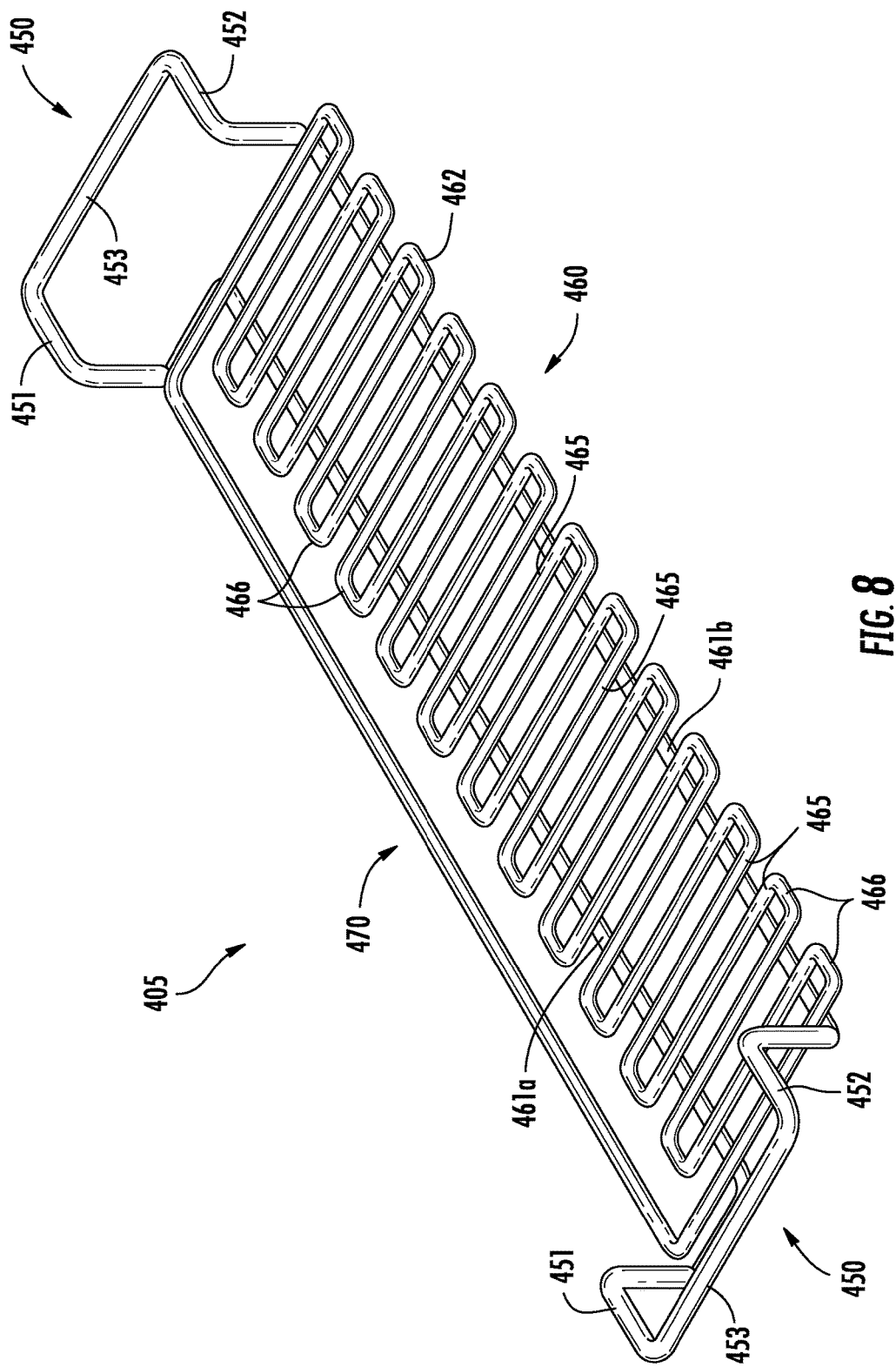
FIG. 8 is a perspective view of yet another exemplary embodiment of a sink accessory.

FIG. 8 illustrates the accessory 405 according to yet another example. As shown, the accessory 405 includes a pair of opposing attachment structures 450 with a supporting structure 460 extending between the attachment structures 450. The accessory 405 may include additional supporting structures. The accessory 405 may also include a retaining member 470 that may be configured to engage the sink or may be configured to support an article (e.g., dishtowel, scrubber brush, etc.). Thus, the retaining member 470 may be configured to provide a supporting structure and/or engage the sink to support the accessory 405.

Each attachment structure 450 may include one or more members that are integrally formed together or formed separately then coupled together. As shown, each attachment structure 450 includes a first member 451, a second member 452, and a third member 453 extending between the first and second members. The first and second members 451, 452 may be configured to interconnect the third member 453 and the retaining member 470. As shown, the first member 451 interconnects the third member 453 and a first elongated member 461a, and the second member 452 interconnects the third member 453 and a second elongated member 461b.

The first and second members 451, 452 have an L-shape as shown, such as to provide the supporting structure 460 and the attachment structure 450 at different relative positions (e.g., elevations, heights, etc.). However, the members 451, 452 may be configured having a different shape (e.g., length, height, thickness, geometry, etc.). For example, the members 451, 452 may be configured having an inverted U-shape.

The supporting structure 460 may be configured having a segment or a plurality of segments. As shown in FIG. 8, the supporting structure 460 includes a pair of spaced apart elongated members 461 (e.g., first elongated member 461a, second elongated member 461b) supporting a second member 462 that includes a plurality of interconnected segments 465 and cross-segments 466 forming an alternating arrangement. Each elongated member 461 of the supporting structure 460 may be configured to extend between ends of the first member 451 of the attachment structure 450. As shown, each first elongated member 461 of the supporting structure 460 is an elongated member provided between and coupled to two spaced apart first members 451, 452 of the attachment structure 450. However, the supporting structure 460 may be configured differently than as shown. For example, the supporting structure 460 may include a plurality of segments and a plurality of cross-segments, where the segments are disconnected from one another and the cross-segments are disconnected from one another, yet the segments and cross-segments are connected to form a grill arrangement.

The retaining member 470 may be configured to span between two segments 465 of the supporting structure 460 to interconnect the retaining member 470 and the supporting structure 460. As shown, the two end segments 465 (e.g., the two outermost segments) are coupled to ends of the retaining member 470. The retaining member 470 may be configured as an elongated member, as a C-shaped member, or may have other suitable shapes to help connect to the supporting structure 460 and/or engage the sink. Additionally, the retaining member 470 may be configured as other retaining members disclosed herein.

It is noted that elements and/or features disclosed in one example may be combined with any other example provided, even if the specific element or configuration of the element is not provided in that example. For example, the accessory (e.g., the accessory 405) may be configured to be adjustable (e.g., having an adjustable length, width, height, and/or angle of incline) and/or may include a sleeve, such as around one or more sections of the accessory to protect the sink and/or the accessory. The accessory 405 may have a sleeve provided around at least a portion of the attachment structure 450 (e.g., the first member 451, the second member 452, and/or the third member 453).

The examples of the accessories disclosed herein that are configured to removably attach to the dividers of the sink may provide numerous advantages over other types of systems, and some of which are described herein. For example, the accessories as disclosed herein may be configured to mount to a divider (e.g., saddle, etc.) used with a sink, such as under-counter mount-type sinks where the rims of the sinks are obscured (e.g., concealed) by a countertop or other kitchen fixture. Accordingly, concealed rims may not be able to support accessories, so having an accessory that is configured to be removably attached to the divider allows for the user to utilize such an accessory. Also for example, accessories that span across multiple walls of the sink may impede or interfere with the use of the sink, since the usable space (e.g., volume) may be reduced considerably. Accordingly, the accessories as disclosed herein may be configured to remain proximate to (e.g., nest with) a portion (e.g., the divider) of the sink to minimize the space impeded by the accessory.

Additionally, the accessories disclosed herein are advantageously configured to support a broad range of objects, some of which may include a sponge, a scrub pad, a steel wool pad, a dish scrubber, a pot scrubber or scrapper, kitchen utensils (e.g., spoons, forks, knives, spatulas, etc.), dishware, glassware, dispensers (e.g., soap dispensers) and other objects that are helpful around the kitchen.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the sink accessories as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:
1. A kitchen sink assembly comprising:
a first basin having an inner wall;
a second basin having an inner wall;
a dividing wall extending between the inner walls of the first and second basins to form a divider therebetween;
a first accessory configured to removably attach to the divider, the first accessory comprising:
a wire-form first attachment structure configured to directly couple the first accessory to a first section of the divider;

a wire-form second attachment structure spaced apart from the first attachment structure and configured to directly couple the first accessory to a second section of the divider;

a first supporting structure configured to extend between the first and second attachment structures adjacent to one of the inner wall of the first basin and the inner wall of the second basin;

a second supporting structure configured to extend between the first and second attachment structures adjacent to the other of the inner wall of the first basin and the inner wall of the second basin; and a second accessory configured to removably attach to the divider, the second accessory comprising:

a first attachment structure configured to couple the second accessory to the first section of the divider;

a second attachment structure spaced apart from the first attachment structure of the second accessory and configured to couple the second accessory to the second section of the divider; and a supporting structure configured to extend between the first and second attachment structures of the second accessory adjacent to one of the inner wall of the first basin and the inner wall of the second basin;

wherein the first attachment structure of the second accessory is configured to nest with the first attachment structure of the first accessory when both first attachment structures are coupled to the first section of the divider; and wherein the second attachment structure of the second accessory is configured to nest with the second attachment structure of the first accessory when both second attachment structures are coupled to the second section of the divider.

2. The sink assembly of claim 1, wherein the first and second accessories are separate structures configured to be detachably connected directly to one another.

3. The sink assembly of claim 1, wherein the first accessory further comprises a retaining member that extends between the first and second attachment structures of the first accessory.

4. The sink assembly of claim 3, wherein the first accessory further comprises a retaining member that extends between the first and second attachment structures of the second accessory.

5. The sink assembly of claim 1, wherein the first accessory engages the divider without fasteners.

6. The sink assembly of claim 1, wherein the second accessory engages the divider without fasteners.

7. The sink assembly of claim 1, wherein the wire-form first attachment structure of the first accessory and the wire-form first attachment structure of the second accessory are separately formed.

8. The sink assembly of claim 1, wherein at least one of the first or second supporting structures of the first accessory includes a plurality of parallel segments.

9. The sink assembly of claim 8, wherein the plurality of parallel segments is planar.

* * * * *